United States Patent [19]

Marcy, III

[11] Patent Number: 5,452,026
[45] Date of Patent: Sep. 19, 1995

[54] DEPTH PERCEPTION IMPROVEMENT FOR PERSONS HAVING A WEAK EYE

[76] Inventor: Henry O. Marcy, III, 12 Heather La., Oak Brook, Ill. 60521

[21] Appl. No.: 246,108

[22] Filed: May 19, 1994

[51] Int. Cl.$^6$ ............................................. G02C 7/16
[52] U.S. Cl. ...................... 351/45; 351/158; 359/36
[58] Field of Search .................. 351/41, 45, 158, 240; 359/36; 352/86

[56] References Cited

U.S. PATENT DOCUMENTS

| | | | |
|---|---|---|---|
| 4,705,371 | 11/1987 | Beard | 352/86 |
| 4,907,860 | 3/1990 | Noble | 350/334 |
| 5,106,179 | 4/1992 | Kamaya et al. | 351/158 |
| 5,245,319 | 9/1993 | Kilian | 345/9 |
| 5,264,877 | 11/1993 | Hussey | 351/45 |

Primary Examiner—William L. Sikes
Assistant Examiner—Huy Mai
Attorney, Agent, or Firm—Fitch, Even, Tabin & Flannery

[57] ABSTRACT

A vision improvement device using glasses in which one or more lens is a rapid shutter, such as a liquid crystal shutter. The subject wears the glasses and the shutter is rapidly operated such that vision from the strong eye is subdued or blocked off long enough to allow the weak eye information to be processed by the brain to promote improved depth perception. One eye is permitted to see while the other eye is occluded. By control of the shutter the weaker eye can be exposed for longer than the stronger eye to compensate for the brain's ability to ignore the weak eye information. In an alternative embodiment, individual eyes may be manipulated to favor one over the other to achieve the benefit of improving depth perception. As such, control over vision results in an improved balance of per-eye information, increasing stereoscopic vision.

20 Claims, 3 Drawing Sheets

DEPTH PERCEPTION IMPROVEMENT FOR PERSONS HAVING A WEAK EYE

BACKGROUND OF THE INVENTION

This invention relates to vision improvement and to the improvement of depth perception in particular for individuals having eyes of unequal vision acuity by improving stereoscopic vision through the use of rapidly operating shutters.

The invention provides for the subduing of the stronger eye by means of an electronic shutter to compensate for the brain's ability to ignore the weak eye information, thus improving binocular eyesight. The stronger eye may individually be subdued by the shutter or vision may be provided as alternating between eyes according to a duty cycle wherein the weaker eye can be exposed for a longer duration than the stronger eye. Thus, usage of the weaker is promoted. The control of vision by each eye is also useful in treating lazy eye, a condition in which the brain begins to ignore information from one eye.

Depth perception is acquired by a number of mechanisms, including psychologic monocular and binocular visual information processed by the brain. Binocular mechanisms obtained through stereoscopic vision are well understood for their role in depth perception. Views from either the righthand side or lefthand side individual eyes produces slightly dissimilar images due to the different vantage points resulting from the lateral separation between the eyes. The simultaneous viewing of these disparate views is what produces the perception of depth. The perception of depth is maintained as long as both eyes are used. If either eye is closed or unused, however, the perception of depth vanishes.

Stereoscopic vision is well understood in the art and forms the basis for stereoscope pictures and three-dimensional vision simulation employing special glasses for separating right and left images to create the perception of depth. Recent embodiments of three-dimensional viewing glasses for use with synchronized stereoscopic display systems have utilized rapid electronic shutters, such as liquid crystal shutters, wherein left eye and right eye images are presented alternatively. See e.g., Noble, U.S. Pat. No. 4,907,860 entitled "Three Dimensional Viewing Glasses" issued Mar. 13, 1990, and Kilian, U.S. Pat. No. 5,245,319 entitled "Synchronized Stereoscopic Display System" issued Sep. 14, 1993. Known glasses for this purpose rapidly alternate vision from one eye to the other allotting an equal time window through which each respective eye is exposed in turn presenting images corresponding to the particular viewing eye.

Such eyeglasses, having rapidly alternating shutters, have also been employed for use in the treatment and diagnosis of certain malfunctions of the eye as well, including malfunctions involving the phenomenon of suppression, such as strabismus (crossed-eye) and amblyopia (lazy eye) wherein one of an individual's eyes is effectively blind through suppression despite actually having the capability for vision. Eyeglasses for alternating vision from one eye to the other in equal time allotments are disclosed in Hussey U.S. Pat. No. 5,264,877 entitled "Eyeglasses For Use In The Treatment/Diagnosis Of Certain Malfunctions Of The Eye" issued Nov. 23, 1993.

There are individuals who do not suffer from suppression but merely have one eye sufficiently weaker in acuity than the other eye such that for the purpose of depth perception the brain tends to ignore information from the weaker eye effectively undermining the ability to perceive depth, although vision from the weaker eye is not altogether suppressed. For such individuals, the use of the eyeglasses taught by Hussey, which merely alternate vision from eye to eye, may not improve depth perception because, given equal time allotments, the brain naturally gives preference to information viewed from the better of the two eyes.

While known techniques for forcing the use of the weaker eye employ eye patches and the like to prevent usage of an eye for a predetermined treatment period, such techniques, while effective, are unpopular and physically unattractive. Moreover, such techniques effectively inhibit depth perception during treatment.

SUMMARY OF THE INVENTION

It is an object of the present invention to overcome various disadvantages of prior art vision improvement techniques.

It is an object of the present invention to provide depth perception improvement for persons having a weak eye.

It is an object of the present invention to subdue the stronger eye and promote vision through the weaker eye to improve depth perception.

It is another object of the invention to improve depth perception by causing information viewed from the weaker of an individual's eyes to be better utilized.

Another object of the invention is to allot viewing time between two eyes, allotting more time to the weaker eye so as to improve depth perception.

A further object of the invention is to provide a variable duty cycle for allotting viewing time between eyes to provide vision improvement.

At least one electronic shutter is provided for selectively occluding the vision from an eye. The shutter may be used to periodically occlude the vision of only the stronger eye. In some instances the regulation of both eyes is desired and a timer is provided for allotting vision between two eyes. The timer may be physician adjustable to favor, for example, the weaker of two eyes. Allotting vision in accordance with the present invention improves stereoscopic vision in people having eyes of substantially different acuity improving depth perception as well as other problems related to disparity in acuity between eyes. In additional embodiments two timers may be employed to define a different and independent duty cycle for each eye, thereby allotting different viewing times for each eye.

Briefly, the present invention relates to a vision improvement device using glasses in which the lenses are rapid shutters, such as liquid crystal shutters for subduing either or both eyes. The subject wears the glasses and at least one shutter is rapidly operated so that vision from one eye is favored over the other. In one embodiment, only one eye is permitted to see at a time while the other eye is occluded. By control of the duty cycle of the shutters the weaker eye can be exposed for longer than the stronger eye to compensate for the brain's ability to ignore the weak eye information. In an alternative embodiment, the active periods of vision of individual eyes may be manipulated to favor one over the other to achieve the benefit of improving depth perception without alternating vision between eyes. This may be achieved by providing separate timers to regulate the periods of occlusion for each eye or by providing a single timer to control periods of occlusion of the stronger eye. Control over periods of vision by electronic shutters, whether variable or predetermined, results in an improved balance of per-eye information, increasing stereoscopic vision.

DETAILED DESCRIPTION OF THE PREFERRED EMBODIMENT

Figure 1:
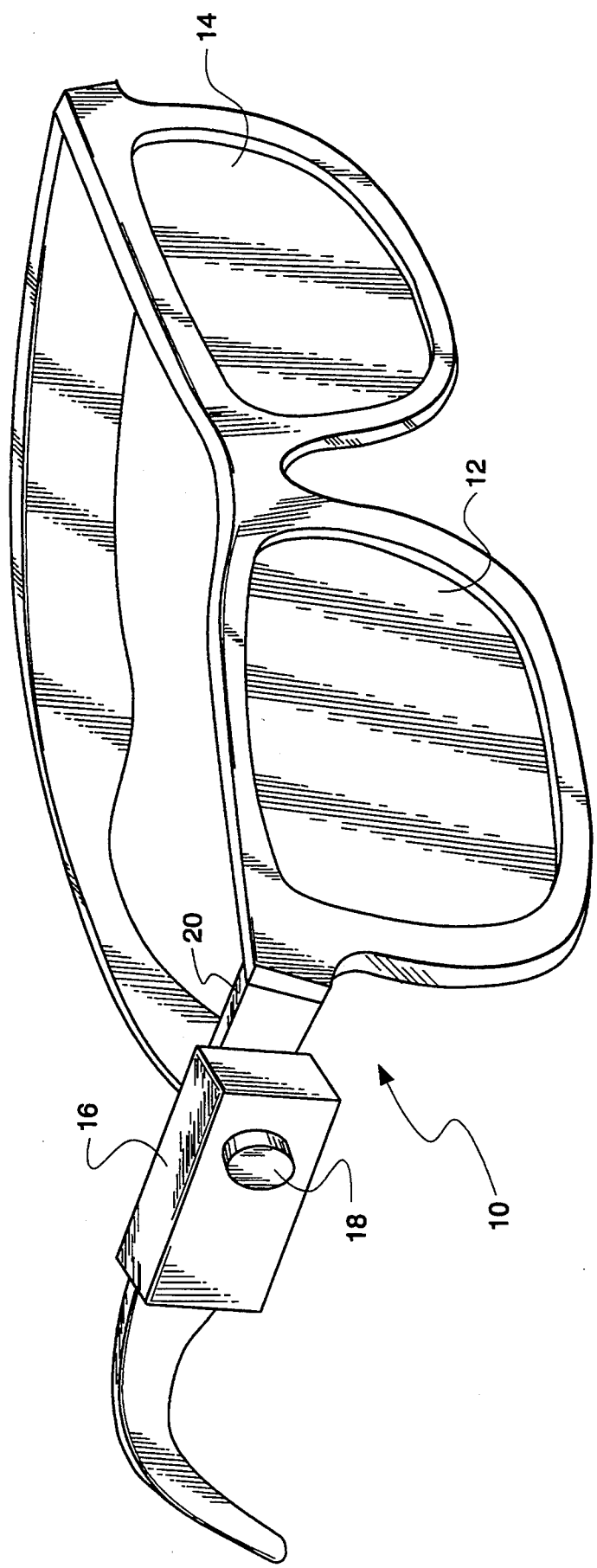
FIG. 1 is a perspective view of a vision improvement device in accordance with the present invention.

FIG. 1 is a perspective view of a vision improvement device 10 embodying the present invention. Vision improvement device 10 includes a right eye liquid crystal shutter 12, a left eye liquid crystal shutter 14 and a control apparatus 16. The control apparatus 16 may include an adjustment knob 18 for varying the duration and the frequency defining vision allotment between the right eye and left eye of an individual wearing the vision improvement device 10. As embodied herein, the right eye liquid crystal shutter 12, the left eye liquid crystal shutter 14 and the control apparatus 16 are mounted upon an eyeglass frame 20.

Figure 2:
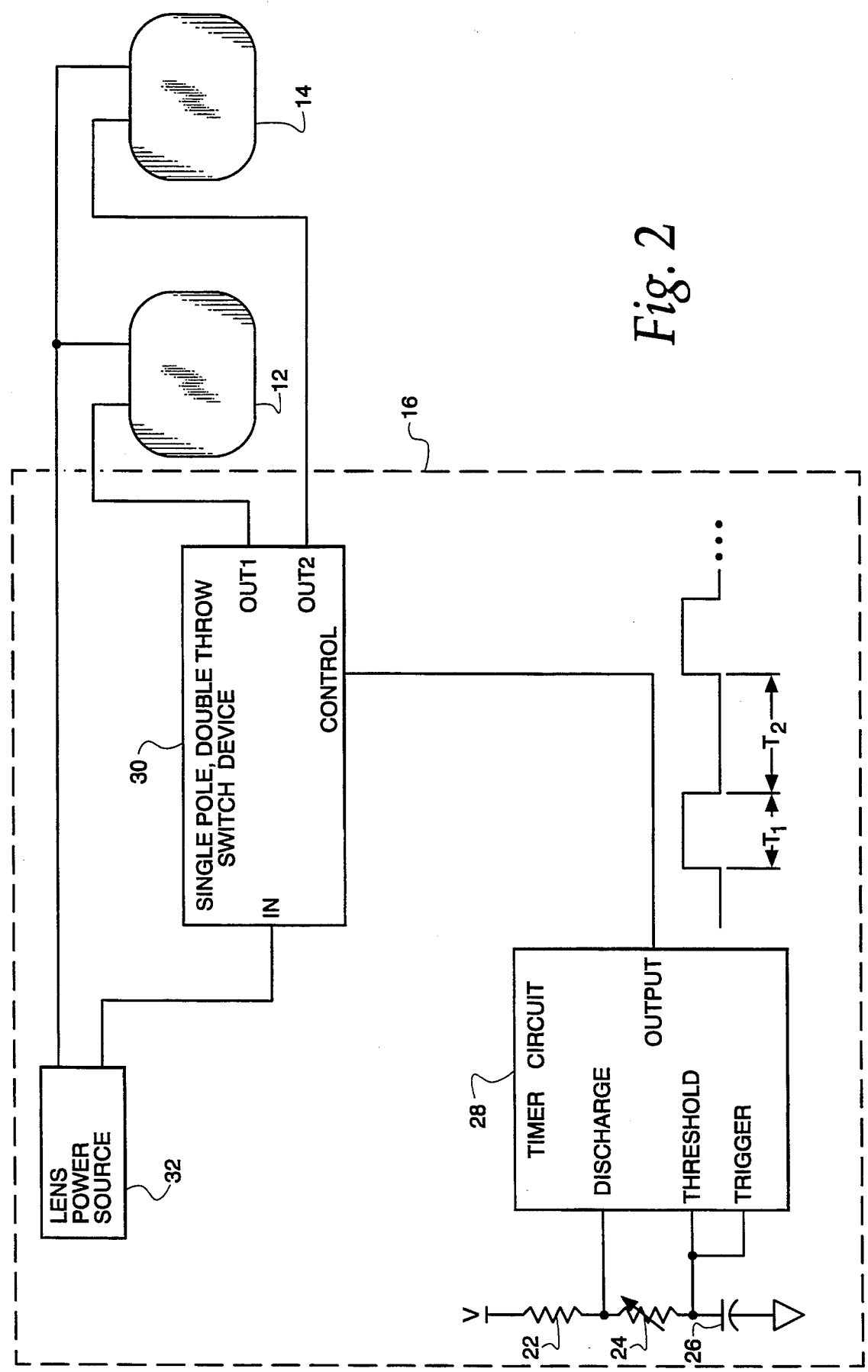
FIG. 2 is a schematic block diagram showing an electronic control apparatus providing vision allotment between eyes defined by a duty cycle in accordance with the present invention.

FIG. 2 shows a schematic block diagram illustrating a first embodiment of the control apparatus 16 shown in the dashed box. There is provided a system for vision improvement including a first electronic shutter for occluding vision from a first eye and a second electronic shutter for occluding vision from a second eye. As embodied herein, the right eye liquid crystal shutter 12 and the left eye liquid crystal shutter 14 are provided as a pair of shutters operable between an open transparent state and a closed obstructed state for occluding vision with electrical signals provided thereto.

Liquid crystal shutters are known in the art for rapidly occluding light under the control of electrical signals. Liquid crystals of this type may be provided for mounting upon corrective lenses of eyeglass frames or goggles.

Timing circuitry is also provided for controlling the operation of the electronic shutters for defining a duty cycle for occluding vision from the first eye to a greater extent than vision from the second eye. As embodied herein, timing components connected in a network, including a fixed timing resistor ($R_f$) 22, a variable timing resistor ($R_v$) 24, and a timing capacitor (C) 26. As shown, the network including $R_f$ 22, $R_v$ 24 and C 26 are connected to a timing circuit 28 at discharge, threshold and trigger inputs to provide a periodic binary signal at the output of the timer circuit 28, which signal is defined by a high time and low time duty cycle ($T_1$, $T_2$).

The timer circuit 28 may be a conventional 555 timer circuit configured as a free-running astable multi-vibrator signal source as shown in the embodiment. For a 555 timer circuit, as the timer circuit 28, component values for the astable multivibrator configuration are determined as follows:

$$T_1 = 0.693 \, (R_f + R_v) \, C \quad (1)$$
$$T_2 = 0.693 \, (R_v) \, C \quad (2)$$

$$\text{Frequency} = \frac{1.44}{(2 \, R_v) \, C} \quad (3)$$

$$\text{Duty Cycle} = \frac{T_1}{T_2} = \frac{R_f + R_v}{R_v} \quad (4)$$

Utilizing particular component value choices for $R_f$ 22, $R_v$ 24 and C 26 to determine the duty cycle as defined by $T_1$ and $T_2$ with the timer circuit 28 is dictated by the particular duty cycle desired for the correction of depth perception in the subject. Of course, the frequency of the signal output from the timer circuit 28 is sufficiently rapid such that flickering of the liquid crystal shutters 12 and 14 is not discernable by the subject.

The variable timing resistor, $R_v$ 24, according to the described embodiment, is controlled by the adjustment knob 18 (FIG. 1). Adjustment may be provided for variable time allotment between eyes to alternate or provide un-obstructed vision for one eye while subduing the other, typically the stronger eye. As can be appreciated by the above equations (1) through (4) relating to the 555 timer for use within the timer circuit 28, $R_v$ 24 controls $T_1$ and $T_2$ to define the duty cycle and also varies frequency of the signal output from the timer circuit 28. Of course, it may be desirable in an alternative embodiment to provide separate control over frequency and duty cycle. Moreover, it should be appreciated that desired adjustments may also be achieved by adjusting other components as well.

Responsive to the duty cycle defined by the timing circuitry, there is provided switching for operating the first electronic shutter and the second electronic shutter to alternate vision from the first to the second eye according to the duty cycle defined by the timing circuitry. As embodied herein, there is provided a single pole, double throw switch device 30 and a lens power source 32 which alternatingly couple an operating signal to either of the right eye liquid crystal shutter 12 or the left eye liquid crystal shutter 14. The single pole, double throw switch device 30 may include a conventional solid state relay or any other switching device having a control lead connectable to the signal output of the timer circuit 28, as shown, to switch a signal brought to the single pole, double throw switch device 30 at the IN connection to either OUT1 or OUT2 at the output of the device. The lens power source 32 provides an electrical signal capable of driving liquid crystal shutters between their opened and closed states.

There has been described a first embodiment of the present invention utilizing a method defining a duty cycle for occluding vision from one eye to a greater extent than vision from another eye, alternating vision from the first eye to the second eye according to the defined duty cycle, wherein the repetition of vision occlusion between eyes according to the duty cycle occlude vision in one eye while permitting vision in the other eye, permitting vision only from one eye at a time. In an alternative embodiment, however, the repetition of vision occlusion in either eye may be determined independent of the other eye wherein the main factor is the vision duty cycle of each eye providing, for example, a longer overall time of non-obstructed vision for the weaker eye than for the stronger eye. This alternative embodiment might include two timer circuits instead of the one timer circuit 28 according to the first embodiment. Plural switching devices are also used for independent control over the liquid crystal shutters for the right eye and left eye liquid crystal shutters 12 and 14, respectively, according to the alternative embodiment. As such, this embodiment provides a control apparatus for operating the pair of shutters between open and closed states according to predetermined frequencies and according to predetermined duty cycles favoring one of the shutters of the pair to provide a longer open state for the favored one of said pair when vision occlusion from the first eye is independent of the second eye. An extension of the alternative embodiment includes only a single timer circuit for use in occluding vision to only the stronger eye.

Figure 3:
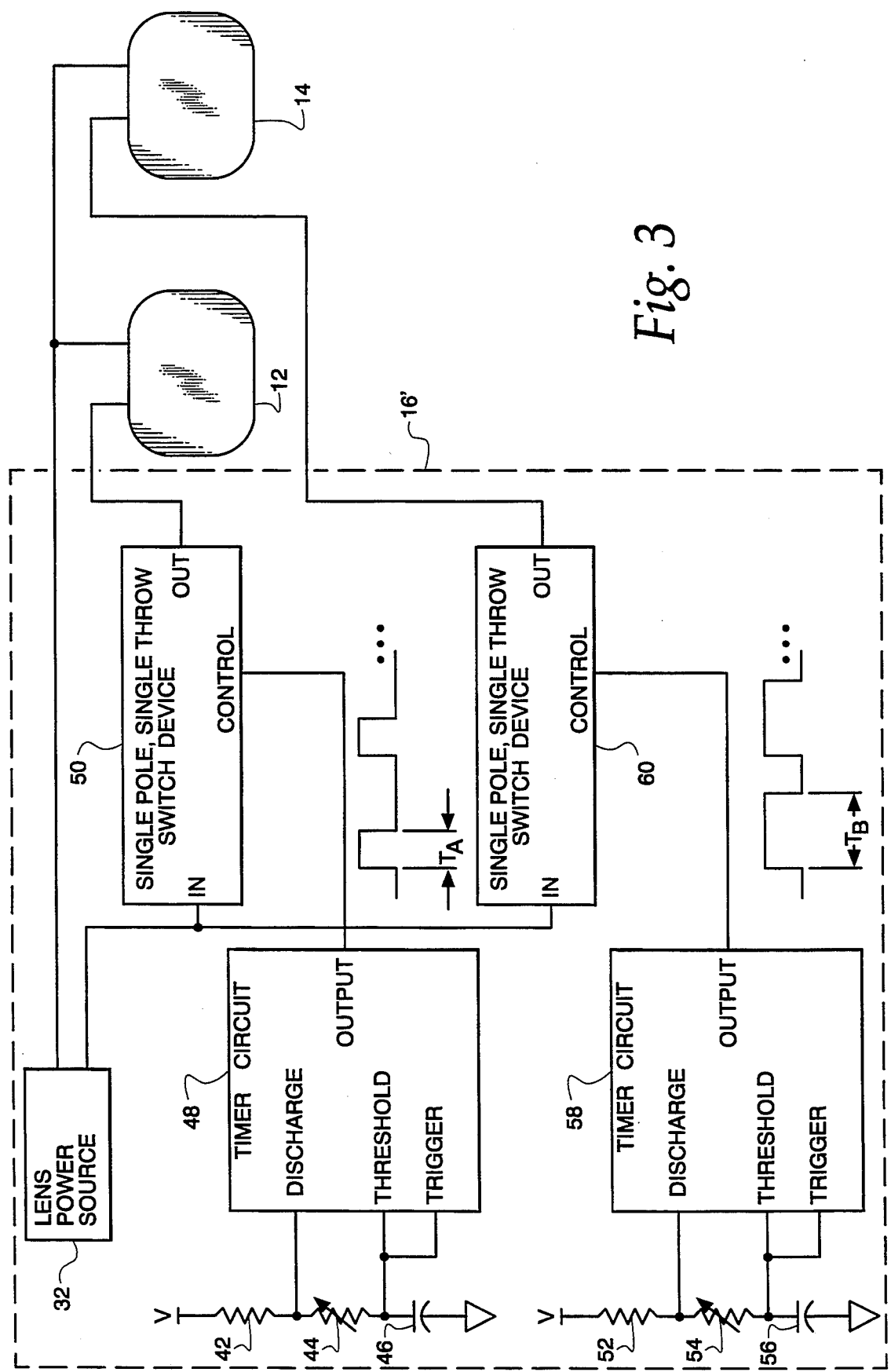
FIG. 3 is a schematic block diagram showing an electronic control apparatus providing independent vision allotment between eyes defined by duty cycles of two timers as an alternative embodiment of the invention.

FIG. 3 shows a schematic block diagram illustrating the above-discussed alternative embodiment utilizing two timer circuits and two switching devices. In an alternative electronic control apparatus 16' independent vision allotment between eyes is provided with timer circuits 48 and 58, and shutter timing is defined by the duty cycles of these respective timers. As embodied herein, the two timer circuits 48 and 58 may be conventional 555 timers as described above in connection with timer circuit 28. Fixed timing resistor 42, variable timing resistor 44 and timing capacitor 46 are connected in a network for use by the timer circuit 48. Fixed timing resistor 52, variable timing resistor 54 and timing capacitor 56 are also connected in a network for use by the timer circuit 58. A single pole, single throw switch device 50 is controlled by the output of timer circuit 48 and a single pole, single throw switch device 60 is controlled by the output of timer circuit 58. The lens power source 32 is provided at the input of the switch devices 50 and 60. The respective outputs of the switch devices 50 and 60 are connected to the right eye liquid crystal shutter 12 and the left eye crystal shutter 14. As shown by the waveforms illustrating the respective duty cycles of the timer circuit 48 and timer circuit 58, switch active times, $T_A$ and $T_B$ are defined for shutter timing. The waveforms at the outputs of the timer circuit 48 and timer circuit 58 independently control the switching of liquid crystal shutter states according to $T_A$ and $T_B$, respectively.

With the extension of this alternative embodiment one timer circuit, e.g. 58, and one switch device, e.g. 60, are not provided or not connected to a shutter, e.g. 14. The switching device 50 is then connected to the shutter 12 or 14 which correspond to the stronger eye. Regulation of the on/off state of the connected shutter can then be used to subdue vision by the stronger eye while allowing maximum vision to the weaker eye.

Other embodiments of the present invention will be apparent to those skilled in the art from consideration of the specification and practice of the invention disclosed herein. It is intended, therefore, that this specification, disclosing depth perception improvement for persons having a weak eye, be considered as exemplary only with the true scope and spirit of the invention being indicated by the following claims.

What is claimed is:

1. A system for improvement of stereoscopic vision comprising:
   first means for occluding vision by a first eye;
   second means for occluding vision by a second eye; and
   means for controlling said first occluding means and said second occluding means comprising,
   means for defining a duty cycle for occluding vision by the first eye to a greater extent than vision from the second eye, and
   means, responsive to said defining means, for operating said first occluding means and said second occluding means to alternate vision from the first eye to the second eye according to the duty cycle defined by said defining means.

2. A system in accordance with claim 1 wherein said first occluding means and said second occluding means each comprise shutters positioned in front of the first eye and the second eye, respectively.

3. A system in accordance with claim 2 wherein said controlling means comprises an electrical circuit for coupling electrical signals to said shutters.

4. A system in accordance with claim 3 wherein said electrical circuit comprises an electrical signal source connected to a switch device controllable by a timer circuit.

5. A system in accordance with claim 2 wherein said defining means comprises means for determining the periodic signal of a predetermined frequency and duty cycle connected to said switching means for controlling the switching of said electrical signal to said shutters.

6. A system in accordance with claim 5 wherein said timing means comprises means for adjusting the duty cycle determined by said timing means.

7. A stereoscopic vision improvement device for improving the depth perception of a wearer having a strong eye and a weak eye, comprising:
   an eyeglass frame;
   a shutter operable between an open transparent state and a closed obstructive state, said shutter being mounted upon said eyeglass frame and positionable in front of the stronger eye of the wearer of said eyeglass frame; and
   a control apparatus for operating said shutter between said open and said closed states according to a predetermined frequency and according to a predetermined period subduing visual information from the stronger eye inhibiting processing of the strong eye information by the wearer and promoting visual information processing by the weak eye improving depth perception and stereoscopic vision thereby.

8. A device in accordance with claim 7 comprising a second shutter, the shutters defining a pair of shutters operable between open and closed states and mounted upon said eyeglass frame positionable in front of the eyes of the wearer, and said control apparatus operating said pair of shutters between said open and said closed states according to predetermined frequencies and according to predetermined duty cycles favoring one of the shutters of said pair to provide a longer open state for the favored one of said shutter pair.

9. A device in accordance with claim 8 wherein said pair of shutters comprises a pair of electronic liquid crystal shutters.

10. A device in accordance with claim 9 wherein said control apparatus comprises at least one timer circuit generating a signal having frequency and duty cycle determined by said timer circuit and used for operation of said pair of shutters.

11. A device in accordance with claim 10 wherein said control apparatus comprises an electrical signal source for operating said shutter pairs between said open and said closed states, and at least one switching device for coupling said electrical signal source to said pair of shutters.

12. A method of vision improvement comprising the steps of:
   (a) occluding vision from a first eye;
   (b) occluding vision from a second eye; and
   (c) defining a duty cycle for occluding vision from the first eye to a greater extent than vision from the second eye, said defining step controlling the repetition of steps (a) and (b) alternating vision from the first eye to the second eye according to the defined duty cycle.

13. A method in accordance with claim 12 wherein said defining step comprises the step of establishing said duty cycle at a predetermined frequency.

14. A method in accordance with claim 13 wherein said establishing step determines said frequency at a rate sufficiently fast so as not to be discernable by the eye when alternating vision from the first eye to the second eye in accordance with the defined duty cycle.

15. A method in accordance with claim 14 wherein the occluding steps each comprise the step of providing liquid crystal shutters for occluding vision therethrough.

16. A method in accordance with claim 14 wherein the repetition of steps (a) and (b) according to said defining step occlude vision from the first eye independent of the second eye.

17. A method in accordance with claim 14 wherein the repetition of steps (a) and (b) first occlude vision from the first eye and then occlude vision from the second eye repeating according to the frequency and duty cycle of said defining step.

18. A method of improving the stereoscopic vision of a subject having a strong eye and a weak eye, the method comprising the steps of:
   (a) subduing visual information from the stronger of two eyes inhibiting processing of the strong eye information by the subject; and
   (b) gating said subduing step according to a time interval rendering the subduing of the stronger eye not discernable by the subject.

19. A method in accordance with claim 18 wherein said subduing step occludes vision temporarily from the stronger eye.

20. A method in accordance with claim 19 wherein said subduing step comprises the step of providing electronic liquid crystal shutter for occluding vision therethrough.

* * * * *